Oct. 19, 1943.  W. E. FORNEY  2,331,968
PROCESS FOR MANUFACTURING NITROGEN DERIVATIVES OF CARBON COMPOUNDS
Filed Aug. 24, 1940
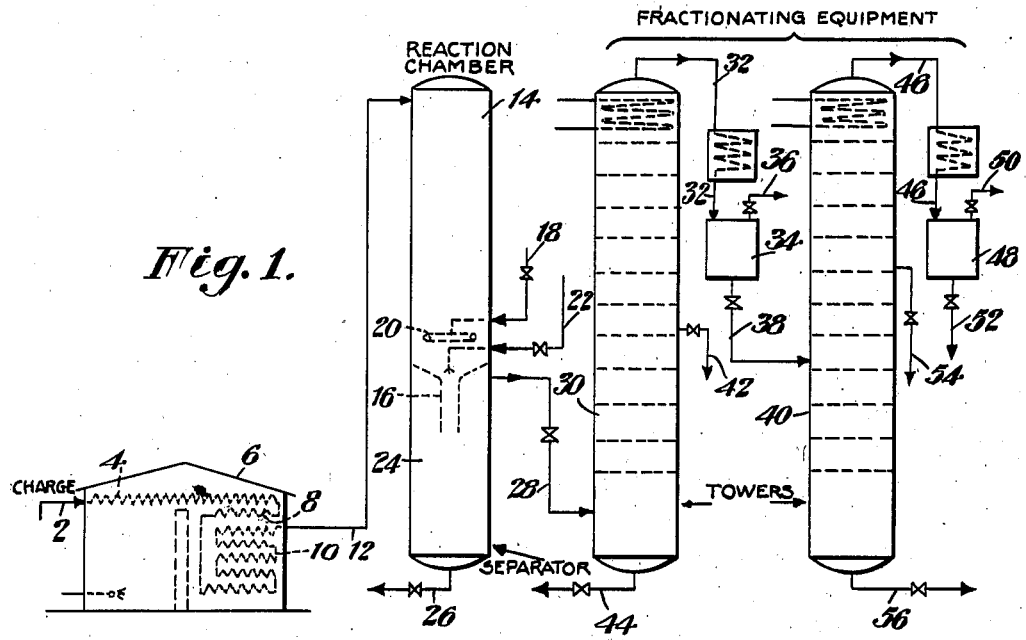
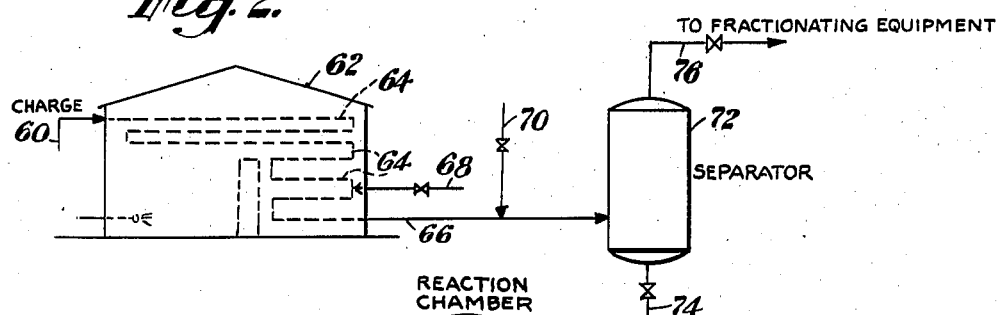
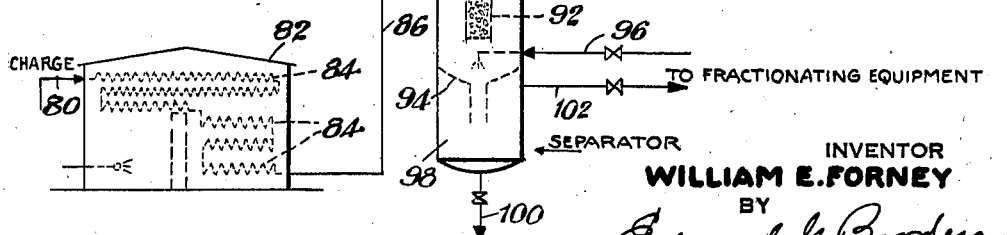
INVENTOR
WILLIAM E. FORNEY
BY
Edmund G. Borden
ATTORNEY Patented Oct. 19, 1943

2,331,968

UNITED STATES PATENT OFFICE 2,331,968

PROCESS FOR MANUFACTURING NITROGEN DERIVATIVES OF CARBON COMPOUNDS

William E. Forney, Merchantville, N. J., assignor to Cities Service Oil Company, New York, N. Y., a corporation of Pennsylvania Application August 24, 1940, Serial No. 354,075

11 Claims. (Cl. 260—578)

This invention relates to improvements in the manufacture of nitrogen derivatives of carbon compounds, and more particularly the invention relates to manufacture of cyclic and acyclic carbon compounds containing nitrogen by reacting carbon compounds with ammonia.

Various processes have been proposed for the manufacture of amines and related products from various hydrocarbon and halogenated hydrocarbon materials. In some instances such processes have been conducted for the manufacture of anti-knock agents for use in gasolines, many amines being known to have the property of suppressing or decreasing the knock of relatively poor gasolines used in internal combustion engines.

The primary object of the present invention is to provide an improved process for the manufacture of nitrogen derivatives of carbon compounds at moderate temperatures in existing forms of apparatus.

A further object of the invention is to provide an improved process for the direct manufacture of amines and related compounds containing nitrogen, by interaction of ammonia and carbon compounds.

Accordingly, the improved process of the present invention comprises the steps of converting hydrocarbon oils, such as heavy naphtha, kerosene and gas oil, into a mixture of reactive or nascent carbon compounds at temperatures of from about 850° to 1025° F., intimately contacting such compounds with ammonia under controlled temperature, pressure and time conditions, to react the ammonia with the active carbon compounds; and thereafter fractionating the resulting products to separate out the desired fractions thereof containing the desired nitrogen derivatives, or to separate the nitrogen compounds from any non-nitrogen carbon compounds.

The details, including additional features and advantages of the process of the present invention, will be understood by those skilled in the art, from the following description of the process taken in connection with the accompanying drawing in which:

Fig. 1 is a diagrammatic flow sheet of an apparatus adapted for carrying out the improved process of the present invention, in which certain elements thereof are shown in vertical position.

Fig. 2 shows a modified form of apparatus for carrying out the improved process in which the fractionating equipment shown in Fig. 1 is omitted.

Fig. 3 is a further form of apparatus modified with respect to that shown in Fig. 1, and in which the fractionating equipment is also omitted.

Referring to Fig. 1 of the drawing, the carbon compounds to be converted into active or nascent derivatives for reaction with ammonia, and which may comprise one of various petroleum fractions such as heavy kerosene and gas oil or mixtures of one or more of these fractions, or topped crude oil is introduced into the apparatus through a charging line 2 and passed into a heating coil 4 mounted in a pipe still furnace 6, of the type commonly employed for cracking or converting petroleum oils in the manufacture of gasoline. The charging stock introduced into the coil 4 is preferably heated rapidly to a temperature of from about 825° to 900° F., at which an active cracking reaction takes place. The stock then passes on through a series of heating coils 8 and 10 in which the oil products are subjected to cracking and converting conditions and heated to a temperature of from about 900° F. to about 1000° F., and then discharged through a transfer line 12 into the upper part of a reaction chamber 14, where the reaction is continued for a time sufficient to convert an additional portion of the oil into active or activated constituents comprising substantial proportions of cyclic, aromatic and olefinic hydrocarbons. The heating in the furnace 6 may be carried out by means of a burner or plurality of burners mounted in a combustion chamber, as shown, so that the coil 4 is heated both by radiation and by convection with hot products of combustion. The hot products of combustion then pass downwardly over the coils 8 and 10 so that the oil stream is first concurrent and then generally countercurrent to the hot products of combustion.

The time of reaction in the coils 8 and 10 and the reaction chamber 14 may be from 5 to 20 minutes, depending upon the temperature to which the oil constituents are heated in the furnace 6. The time however may be conveniently determined on the basis of the reaction products formed, it having been found that at temperatures between about 975° F. and 1050° F., that the reaction may be measured by the content of aromatic or olefinic hydrocarbons in the products produced by the time the oil constituents reach the lower portion of the chamber 14. In the present example, the aromatic hydrocarbons preferably comprise at least 25% of the condensable constituents boiling within the range of 100°–400° F., discharged from the chamber 14, but in actual practice products have been obtained which are 94% aromatic hydrocarbons.

Under the preferred conditions, the reaction is continued in chamber 14 as the products move slowly downwardly through the chamber from which they are discharged through a funnel section 16. As the products approach the funnel 16 their temperature will be approximately from 900° to 1050° F., depending upon the desired conditions and extent of the reaction, but as these products approach the funnel 16, they are brought in intimate contact with ammonia introduced under pressure through a valved line 18, and intimately sprayed into the high temperature constituents from a spray ring 20.

It will be understood that, after the hydrocarbon oils have passed through the heating and cracking coils and the reaction chamber, these oils are made up of a very large number of different hydrocarbons; these hydrocarbons being of the paraffinic, aromatic, olefinic and cyclic types and the polymerization products of these various types of hydrocarbons. An excess of the amount of ammonia that theoretically would be required to satisfy the equations involving the various reactions between ammonia and the hydrocarbons for the manufacture of amines is preferably introduced through the line 18. It may be understood also that the reactions between ammonia and the hydrocarbons may produce nitrogen compounds other than amines. No attempt is made by this process to produce amine compounds in a pure state on account of the fact that the hydrocarbon mixture is so complex that it is not practicable to do so.

The introduction of ammonia into the reaction chamber at or above the funnel 16 has the additional function of quickly quenching the oil products in the reaction chamber to reduce the temperature of the oil products quickly and abruptly to a temperature where the cracking, or thermal decomposition of the hydrocarbons stops. In many cases it is not desirable to do all the quenching or cooling of the hydrocarbon vapors with ammonia. The ammonia may be diluted with water to assist in this reaction. Furthermore the ammonia may be mixed with oil, such as gasoline, kerosene, gas oil, or other distillates, for the purpose of quenching or cooling the cracked products.

The ammonia and other quenching liquids act to quickly adjust the temperature of the zone immediately adjacent the spray ring 20 so that the reaction between the ammonia and the active hydrocarbon compounds will be properly carried out without involving undesirable secondary reactions or decomposition of the primary reaction products of the hydrocarbons and ammonia. At this point the temperature may range from 800° to about 950° F. This temperature, however, exists for only a short time or a matter of seconds, so that the reaction products of ammonia with the hydrocarbon oils will be brought to a comparatively low temperature of 700° F. or lower, by the combined chilling action of the ammonia and additional water or oil introduced through a valved line 22.

After the cooled products are chilled and passed through the funnel section 16, they enter a separating chamber 24 and are separated into vapors and high boiling liquid constituents which may condense at temperatures of about 700° F.; such constituents being withdrawn through a valved line 26. The vapors separated out in the separator 24 are conducted through a vapor line 28 into the lower portion of a fractionating tower 30. Temperatures and pressures are so regulated that a distillate having an end boiling point of 450° to 470° F. is produced, after passing thru vapor line 32 and condensing. This distillate is collected in receiver 34. A portion of the normally gaseous hydrocarbon constituents produced by the cracking is discharged from the separator 34 through a valved line 36, while the condensed product is passed through a valved line 38 and suitable heat exchange means into a second fractionating tower 40 for refractionation. Higher boiling fractions are recovered from the tower 30 as a side stream through a valved line 42 and as a bottoms product through a valved line 44.

The fractionation carried out in the tower 40 preferably divides the overhead condensate from the tower 30 into three fractions, the lighter of which is passed overhead in vapor form through a vapor line 46, is condensed by a condenser therein, and collected in a receiver 48. Some normally gaseous constituents may separate out in the receiver 48, and they are discharged through a valved line 50 while the condensate may be withdrawn as a product through a valved line 52. This product may be rather low boiling and have an end point of about 50° F. or lower. An intermediate product having a boiling range of from 80° to 250° F. may be removed from the tower 40 through a valved line 54 while a higher boiling product boiling from 200° to 475° F. may be removed from the bottom of the tower through a valved line 56.

The operations carried out in the apparatus shown in Fig. 1 are preferably conducted under considerable superatmospheric pressure, so that the charging stock introduced through the line 2 is supplied at a pressure of from about 400 to 650 lbs. per square inch. A back pressure may be maintained on the pipe still furnace and reaction chamber 14 from the valve in line 28, preferably so that a pressure of from 200 to 500 lbs. per square inch is maintained in the chamber 14. The fractionating operation carried out in the tower 30 is preferably at a pressure of from 175 to 200 lbs. per square inch maintained by a back pressure from the receiver 34. The pressure in tower 40 may be lower, or from 75 to 150 lbs. per square inch.

The product withdrawn through the line 26 will have a boiling point above 550° and will contain considerable quantities of residual oil products containing nitrogen compounds. The distillates removed through the lines 42 and 44 will have boiling ranges respectively of from about 450° to 600° F., and from 500° to about 750° F. The product removed through line 56 will have a boiling range of from about 200° to 475° F.; that removed through line 54, a range of from 80° to about 250° F. These products will contain nitrogen derivatives, particularly primary, secondary and tertiary amine compounds which boil within the ranges indicated. Such nitrogen compounds may be recovered from these individual fractions by extraction with suitable selective solvents such for example as croton aldehyde, liquid $NH_3$ and sulfur dioxide, which have a selective action on amines and related nitrogen derivatives of carbon compounds. These compounds may also be removed by a treatment with dilute acids since they are in many cases basic compounds.

The process described above may be carried out in the apparatus shown in Fig. 2 by supplying a charging stock of the type referred to above through a supply line 60 at a pressure of from 400 to 650 lbs. per square inch, and introducing it into a pipe still furnace 62 in which the stock flows through a series of heating coils 64 to be rapidly heated to a temperature of about 900° F. and then subjected to a time reaction of sufficient length to give the reactions and products described above by the time the stock has passed substantially through the coils. The high temperature reaction products containing active or nascent constituents are contacted with ammonia, admitted through a line 68 into the lower portion of the convection section of the coils 64. The resulting mixture of products is discharged from coils 64 through a transfer line 66. The time allowed at the high temperature after the introduction of the ammonia is sufficient to effect the desired reaction between the ammonia and the active olefinic, aromatic and other cyclic hydrocarbons. The reaction is stopped at the desired point by introducing a cooling medium similar to that noted above through a valved line 70 in sufficient quantity to bring the temperature down to about 700° F., at which point the products pass into a separator 72 which corresponds to the separator 24 shown in Fig. 1. Any condensate separated out in the separator 72 is removed through a valved line 74 while the vapors are conducted through a valved vapor line 76 to "fractionating equipment" such as the towers 30 and 40 shown in connection with Fig. 1. The reaction conditions, such as temperature, pressure and time, maintained in the convection section of coils 64 after the introduction of ammonia should be approximately the same as those maintained in the zone around the spray ring 20 in chamber 14.

Fig. 3 shows a further modification of the process in which a charging stock such as that described above is introduced at a pressure of from 400 to 650 lbs. per square inch through a charging line 80 and passed into a pipe still furnace 82 wherein the oil flows through a series of heating coils 84 operated under temperature, pressure, and time conditions adapted to accomplish approximately the results described in connection with the furnace 6. The high temperature products produced in the coils 84, are conducted through a transfer line 86 into the upper portion of an enlarged reaction chamber 88, which may be operated substantially under the conditions described for the reaction chamber 14. The ammonia introduced into the lower portion of the reaction chamber 88 to effect the production of the desired amines and other nitrogen derivatives is introduced through a valved line 90, and passed through a small catalyst chamber 92, mounted in the lower portion of the reaction chamber 88 and heated by the hot vapor products passing therearound.

The catalyst chamber 92 preferably has an open (screened) bottom and contains a suitable catalyst such as a carrier material on which is deposited nickel, copper or iron. As the ammonia passes from the line 90 through the catalyst, it is activated or converted into a nascent reactive state so that it instantly reacts with the active carbon compounds in the lower portion of the chamber 88. Such nitrogen compounds as are formed, pass quickly into the entrance of a funnel section 94 and are instantly chilled to a temperature of about 700° F. by the introduction of a cooling medium through a valved line 96 which is sprayed directly into the funnel 94. The chilled products pass on into a separator 98 from which high boiling constituents condensed therein are removed through a valved line 100. The separated vapors are conducted from the separator 98 to suitable "fractionating equipment" through a valved vapor line 102. The fractionating equipment may be identical with that shown in Fig. 1, and the products may be divided and recovered in the same way.

To a considerable extent the nitrogen derivatives of carbon compounds produced in accordance with the present process are of undetermined constitution. The compounds may comprise amines, amides, nitriles, pyridine, aniline and its homologues, as well as aminophenols produced from oxygen compounds present in the petroleum charging stocks. A few of the important aromatic nitrogen compounds contained in the products comprise aniline, the three toluidines and the xylidines, mesidine and cumidine. Other nitrogen derivatives of benzene comprise side chain derivatives containing from two to six carbon atoms and a $NH_2$ group or equivalent. Such compounds are apparently produced from said chain derivatives of benzene in which the side chain is unsaturated and reacts readily with ammonia. Such benzene compounds may have one or more side chains and one or more nitrogen groups.

The conversion reactions carried out on the hydrocarbon charging stocks produce aromatic hydrocarbons of the type of naphthalene, which with ammonia are converted into naphtholamines and diamine compounds. Various alkyl amines containing from three to twelve carbon atoms are also formed, both straight and branched chain compounds. These compounds are largely formed from olefines present in the reaction zone at the time the ammonia is brought into contact with the nascent products at the high temperature.

The nitrogen derivatives of carbon compounds produced in accordance with the present invention may be used for any purpose such as in the manufacture of dyes, explosives and other products and any fraction thereof may be subjected to oxidation to produce other desired nitrogen compounds or intermediates. The oil fractions removed from the lines 42 and 44 may be subjected to partial oxidation to produce valuable fuels for Diesel motors, or they may be used directly with considerable advantages. The fractions removed from the lines 52, 54 and 56 may be blended with gasolines to increase their anti-knock value. The lower boiling fractions may be blended with heavy gasoline, while the higher boiling fractions may be blended with natural gasoline or straight run gasoline to produce a motor fuel of desired boiling range and octane rating.

The proportion of ammonia to charging stock introduced into the reaction zones through the lines, 22, 68 and 90, may vary considerably according to the proportion of reactive constituents, such as aromatic, olefinic and other reactive carbon compounds present in the high temperature products. As stated above an excess of ammonia should be used but under some conditions a proportion of from three to five mols per mol of reactive compounds, or of compounds to be formed, may be used. In such cases the excess ammonia may be recovered for reuse in the process. Systems for such recovery are well known and usually involve the installation of suitable washing equipment in which the gases or vapors containing ammonia are brought in contact with suitable water solutions.

While the use of a catalyst in connection with the activation of ammonia has been described only in connection with the modification shown in Fig. 3, it is to be understood that an ammonia catalyst chamber may be mounted in furnaces 6, 62 or 82. The activated ammonia produced in such a chamber would then be conducted into the chamber 14 through distributor 20, into the lower portion of the coil 64 or into the lower portion of the reaction chamber 88, respectively.

While the process of the present invention relates primarily to the production of certain basic materials comprising compounds of carbon containing nitrogen, it will be apparent that various modifications may be made in the process and in the segregation of products, without departing from the spirit and scope of the invention. Furthermore, the nitrogen compounds may be separated and recovered as individual fractions or constituents, for use in various industries.

Having thus described the invention in its preferred form, what is claimed as new is:

1. The process of manufacturing nitrogen derivatives of carbon compounds from a mixture of highly heated cracked products produced by the steps of passing a petroleum oil distillate in a confined stream of restricted cross section through a heating zone wherein the distillate is vaporized and heated to a reaction temperature of from about 950° to 1050° F., and wherein the distillate is maintained substantially within said temperature range and converted into a mixture of highly heated constituents containing in excess of 25% of aromatic hydrocarbons, which comprises abruptly reducing the temperature of the highly heated constituents to about 800° F. by introducing an aqueous solution of ammonia as a cooling fluid into the highly heated converted constituents, reacting the resulting mixture for a short period of time which is a matter of seconds to produce nitrogen derivatives of the carbon compounds of said mixture, abruptly terminating the reaction between the ammonia and the carbon compounds by quickly cooling the reacting constituents to a point below the reaction temperature, and fractionating the resulting products to obtain the desired fractions containing valuable nitrogen derivatives of carbon compounds.

2. The process as defined by claim 1 in which the temperature of the mixture of highly heated cracked products is within approximately the range of 800° to 950° F. at the point where the ammonia is introduced thereinto.

3. The process as defined by claim 1 in which said mixture of highly heated cracked products is produced at a superatmospheric pressure of from about 200 to 500 lbs. per square inch.

4. The process as defined by claim 1 in which the ammonia is introduced into the highly heated cracked products and reacted therewith at a pressure of approximately 200 lbs. per square inch.

5. The process of manufacturing nitrogen derivatives of aromatic carbon compounds, which comprises intimately mingling ammonia with a previously prepared highly heated mixture including at least approximately 50% of aromatic hydrocarbons in activated nascent condition, reacting the ammonia with the said highly heated mixture at a temperature of approximately 800° F. to form nitrogen derivatives of aromatic hydrocarbons contained in said mixture, and abruptly terminating the reaction by quickly cooling the mixture to a point below the reaction temperature.

6. The process of manufacturing nitrogen derivatives of carbon compounds, which comprises intimately mingling a nitrogen compound selected from ammonia and ammonium hydroxide with a highly heated mixture of active nascent hydrocarbons containing substantial proportions of aromatic and olefinic constituents at a temperature of from 800° to 950° F., reacting the nitrogen compound with the aromatic and olefinic hydrocarbons to produce a reaction mixture of undetermined composition but comprising an appreciable proportion of nitrogen derivatives of the aromatic and olefinic hydrocarbons of said mixture, and abruptly terminating the reaction after a matter of seconds of reaction time by quickly cooling the reaction products to a point below the reaction temperature.

7. The process of manufacturing nitrogen derivatives of carbon compounds from a highly heated mixture of hydrocarbon products containing aromatic and olefinic hydrocarbons produced in a high temperature oil conversion operation, which comprises simultaneously abruptly reducing the temperature of such highly heated products from a temperature substantially above 950° F. to a temperature of about 800° F. by introducing a liquid cooling medium containing ammonia into the resulting cooled hydrocarbon products and reacting the ammonia with the hydrocarbon products at about said reduced temperature, and terminating the reaction between the ammonia and constituents of said mixture by abruptly reducing the temperature thereof below 700° F.

8. The process of manufacturing nitrogen derivatives as defined by claim 7 in which the ammonia is activated by passing it in contact with a highly heated catalyst body.

9. The process of manufacturing nitrogen derivatives of carbon compounds from a mixture of highly heated cracked products produced by the steps of passing a petroleum oil distillate in a confined stream of restricted cross section through a heating zone wherein the distillate is vaporized and heated to a reaction temperature of from about 950° F. to 1050° F., and wherein the distillate is maintained substantially within said temperature range until the distillate is converted into a mixture of highly heated constituents containing approximately 80% of aromatic hydrocarbons, which comprises introducing ammonia into the said highly heated cracked and converted constituents and abruptly reducing the temperature thereof, reacting the resulting mixture at the lower temperature but above 800° F. to produce aromatic nitrogen derivatives from aromatic hydrocarbons of said mixture, abruptly terminating the reaction with ammonia by quickly cooling the reaction products to a temperature of approximately 700° F. thereby avoiding appreciable decomposition of the formed nitrogen derivatives and fractionating the resulting products to obtain the desired fractions containing valuable nitrogen derivatives of aromatic hydrocarbons.

10. The process as defined by claim 9 in which the temperature of the mixture of highly heated cracked products is within approximately the range of 800° to 950° F. at the point where the ammonia is introduced thereinto.

11. The process of manufacturing nitrogen derivatives of carbon compounds from a highly heated mixture of hydrocarbon products containing substantial proportions of aromatic and olefinic hydrocarbons, which comprises quickly cooling said highly heated mixture of hydrocarbon products from a temperature substantially above 950° F. by mingling therewith a liquid cooling medium containing ammonia, reacting the ammonia with the cooled mixture of hydrocarbons at a temperature of from 800° F. to 950° F. for a relatively short period of time which is a matter of seconds, thereafter rapidly cooling the resulting reaction products to a temperature of 700° F. and fractionating the resulting cooled products to obtain the desired fractions containing nitrogen derivatives of the aromatic and olefinic hydrocarbons.

WILLIAM E. FORNEY.